(12) United States Patent
Joseph et al.

(10) Patent No.: US 10,288,991 B2
(45) Date of Patent: May 14, 2019

(54) COLORED PAINT WITH FLUORESCENCE

(71) Applicant: Disney Enterprises, Inc., Burbank, CA (US)

(72) Inventors: Daniel M. Joseph, Windermere, FL (US); Steven A. Johnson, Stevenson Ranch, CA (US)

(73) Assignee: Disney Enterprises, Inc., Burbank, CA (US)

(*) Notice: Subject to any disclaimer, the term of this patent is extended or adjusted under 35 U.S.C. 154(b) by 14 days.

(21) Appl. No.: 15/493,545

(22) Filed: Apr. 21, 2017

(65) Prior Publication Data

US 2018/0307128 A1 Oct. 25, 2018

(51) Int. Cl.
| | |
|---|---|
| *G03B 21/60* | (2014.01) |
| *C09D 7/42* | (2018.01) |
| *C09D 5/22* | (2006.01) |
| *G03B 21/20* | (2006.01) |
| *G03B 21/00* | (2006.01) |
| *C09K 11/02* | (2006.01) |
| *C09D 133/06* | (2006.01) |

(52) U.S. Cl.
CPC ............. *G03B 21/204* (2013.01); *C09D 5/22* (2013.01); *C09D 7/42* (2018.01); *C09D 133/06* (2013.01); *C09K 11/025* (2013.01); *G03B 21/005* (2013.01); *G03B 21/60* (2013.01)

(58) Field of Classification Search
CPC ...... G03B 21/567; G03B 21/56; G03B 21/60; C09D 7/42; C09D 5/22; C09D 157/06; C09K 11/025
USPC ............................................. 359/452
See application file for complete search history.

(56) References Cited

U.S. PATENT DOCUMENTS

| | | | |
|---|---|---|---|
| 7,656,580 B2 * | 2/2010 | Chang | G02B 5/0215 359/452 |
| 2005/0088737 A1 * | 4/2005 | Piehl | G03B 21/56 359/443 |
| 2011/0002035 A1 * | 1/2011 | Okamoto | G03B 21/56 359/443 |

* cited by examiner

*Primary Examiner* — Ryan D Howard
(74) *Attorney, Agent, or Firm* — Dorsey & Whitney LLP

(57) ABSTRACT

A paint composition comprises a carrier material, a plurality of ambient light absorbing pigment particles dispersed in the carrier material comprising a component that absorbs predetermined visible wavelengths, and a plurality of fluorescent pigment particles dispersed in the carrier material, wherein the fluorescent pigment particles emit a first color and the paint composition emits a second color different from the first color when illuminated by an ultraviolet light source. The paint composition can act as a video projection surface with usable screen gain.

21 Claims, 3 Drawing Sheets

COLORED PAINT WITH FLUORESCENCE

BACKGROUND

In many fields, it is desirable to have paint that appears as one color under a first light source and appears as a second color under a second light source. For example, star fields (such as those in planetariums and amusement park rides) ideally use a black background on which the star field can be projected. However, black backgrounds typically provide little to no screen gain, making projected star fields difficult to see. Screen gain measures the reflectivity of a screen or surface, normalized to a standard white (magnesium oxide) board. Screens with a screen gain of 1.0 have the same reflectivity as the standard, screens with a screen gain of less than 1.0 have lower reflectivity than the standard board, and screens with a screen gain of greater than 1.0 have a reflectivity that is greater than the standard board. Non-black backgrounds (such as grey) can be used in order to enhance the brightness of the projected stars by providing surfaces with higher screen gain than typical black backgrounds. However, non-black backgrounds may be perceptible to observers, thus destroying the illusion of a realistic star field with indeterminate depth.

Fluorescent paints have been used to create backgrounds of various colors. Many traditional fluorescent paints require a two-step application process. For example, a base coat having the desired base color is applied to a surface or substrate first. A second coat, comprising a colorless carrier material as well as the fluorescent pigment is then applied on top of the base coat. When the fluorescent pigment is not fluorescing, light merely passes through the colorless carrier material and is reflected outwardly by the base coat. When the fluorescent pigments are fluorescing, the light is absorbed by the fluorescent pigment within the colorless carrier material and then emitted outwardly through the colorless carrier material. Such two-step application processes are time consuming to apply when a relatively large area (e.g. thousands of square feet) must be painted.

Alternative methods of producing star fields include tiling display, such as LED screens, or routing fiber optic cable to holes in a black surface. However, the number of display screens required is typically cost prohibitive, and routing the fiber optic cable is highly labor intensive and results in a completely static star field, thus limiting the display options. Therefore, there is a need for an inexpensive way to provide a black background on which a bright, clear star field may be projected.

SUMMARY

In one example, a paint composition is disclosed. The paint composition comprises a carrier material, a plurality of ambient light absorbing pigment particles dispersed in the carrier material comprising a component that absorbs predetermined visible wavelengths, and a plurality of fluorescent pigment particles dispersed throughout the carrier material, wherein the fluorescent pigment particles emit a first color and the paint composition emits a second color different from the first color when illuminated by an ultraviolet light source.

In another example, a paint is disclosed. The paint comprises a binder material, a plurality of ambient light absorbing pigment particles dispersed throughout the binder material, and a plurality of fluorescent pigment particles dispersed throughout the binder material, wherein the paint appears black under non-directional light and exhibits a screen gain of between 0.10 and 0.30 under directional light.

In yet another example, a projection system is disclosed. The projection surface comprises a directional light source and a projection surface. The projection surface is coated with a paint composition comprising a binder material, a plurality of visible light absorptive particles dispersed throughout the binder material, and a plurality of fluorescent pigment particles dispersed throughout the binder material, wherein the paint composition absorbs ambient non-directional visible light and the paint composition emits white light under emissions from an ultraviolet light source.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that render other details difficult to perceive may have been omitted. It should be understood that the claimed subject matter is not necessarily limited to the particular examples or arrangements described herein.

BRIEF DESCRIPTION OF THE DRAWINGS

The accompanying drawings, which are incorporated into and constitute a part of the specification, illustrate examples of the disclosure and, together with the general description given above and the detailed description given below, serve to explain principles of these examples.

DETAILED DESCRIPTION

A paint composition is disclosed that includes a colorless carrier material with light absorbing pigment particles and fluorescent pigment particles dispersed therein. The light absorbing pigment particles comprise, for example, carbon black, biochar, vertically aligned nanotube array particles, or other organic or inorganic particle that is sufficiently light absorptive as well as chemically and physically compatible with the carrier and fluorescent pigment to meet the needs of a particular application and environment. The paint composition appears as matte black under non-directional light (e.g., ambient light), and fluoresces as pure white when subjected to directional light (e.g., laser light) having a wavelength of 405 nm. As used herein, "matte black" refers to a black surface with relatively low specular reflection having a gloss level of between about 1 and 3. As used herein, "pure white" refers to full RGB white light including wavelengths of approximately 635 nm, 560 nm, and 470 nm. Additionally, the described composition unexpectedly demonstrates a screen gain of between about 0.10 and 0.30 when directional light (e.g., from a projector) is projected onto the composition (e.g., in the form of images or video). Such a high screen gain is unexpected because black matte and flat surfaces tend to absorb light making for extremely low (i.e., near zero) screen gains. Many traditional screens with screen gains of about 0.15 appear to observers not as black, but as a much lighter grey, making them unsuitable for applications that require the appearance of a black background (e.g., a night sky).

Figure 1:
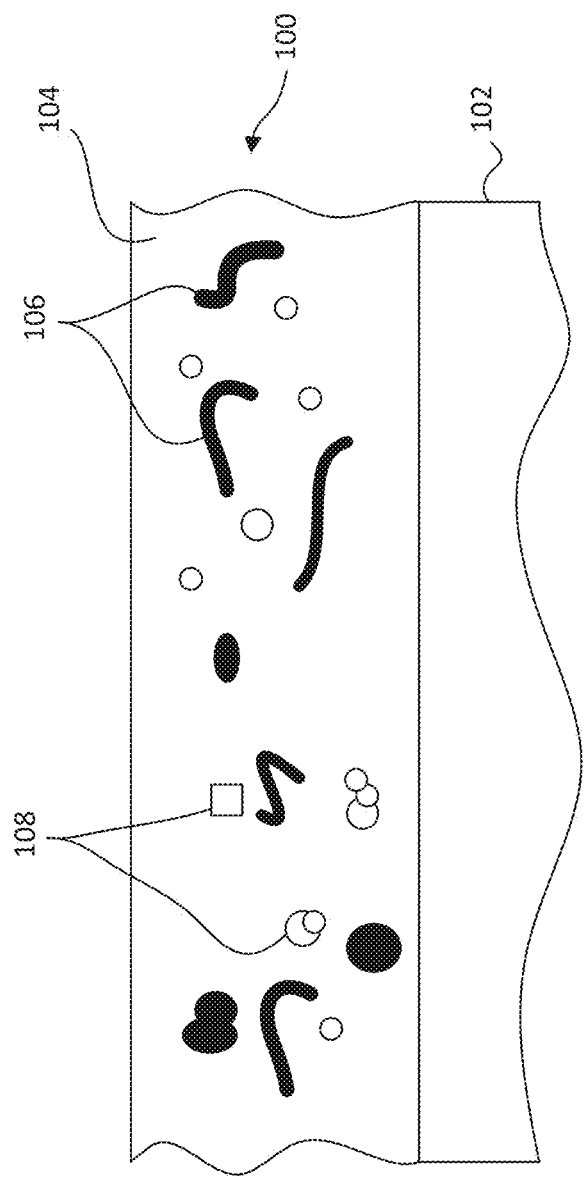
FIG. 1 is a cross-sectional view of a paint composition applied to a substrate.

FIG. 1 is a cross-sectional view of a paint composition, generally designated 100, applied to a substrate 102. It should be appreciated that the components shown in FIG. 1 are presented so as to make the relevant features clear, and therefore the size and shape of the various components shown are not necessarily shown to scale. The substrate 102 can generally be any type of surface. For example, the substrate 102 may be a wall, a ceiling, a projection screen, an object, fabric, or any other type of surface. In some examples, the paint composition 100 is selectively applied one or more portions of the substrate 102. In such an example embodiment, certain portions of the substrate 102 may be optimized for screen gain while other portions of the substrate 102 are optimized for appearing pure white under light from a directional light source of a particular wavelength or wavelengths.

The paint composition 100 includes a paint medium 104, a plurality of visible light absorptive particles 106, and a plurality of fluorescent pigment particles 108. The paint medium 104 is a colorless carrier material that substantially transmits UV light and suspends the black pigment particles 106, and the fluorescent pigment particles 108. Suitable paint media 104 include, but are not limited to, water, polymeric media, etc. Polymeric media suitable for a composition described herein may comprise polyesters, acrylics, epoxies, alkyds, polyurethane, or latex. Additionally, a medium suitable for a composition described herein may include glycol ether, ethylene glycol, etc. In a specific example, the paint medium 104 is a water-based acrylic paint medium.

The visible light absorptive particles 106 ensure that the paint composition 100 absorbs sufficient light to appear black under ambient and non-directional visible light, such as diffuse light from a light bulb. In some examples, the visible light absorptive particles 106 comprise carbon black pigment such as Emperor® Carbon Black available from Cabot Corporation (product numbers 1200, 1600, 1800, and 2000). The visible light absorptive particles 106 may generally have any shape, including but not limited to spherical, elongated strands, arbitrary shapes, or any other shape. The visible light absorptive particles 106 are dispersed in the paint medium 104. Black pigments absorb light across a wide spectrum, but the absorbance may vary with wavelength and may drop off in the UV and near UV wavelengths. Absorption spectrum may also be affected by particle size and shape. While several explanations may account for the yellow-to-white color shifting properties of the present invention, it may be that the black pigments that are partially reflective of visible light energy at the far end (violet) of the visible spectrum at the same wavelengths that are emitted by common 405 nm UV sources. Accordingly, a variety of materials may be suitable for particles 106, but in some applications it may be useful to select materials as well as particle size and shape that allow some reflectance of near-UV visible wavelengths while at the same time absorbing visible light at wavelengths characteristic of ambient and non-directional present in a particular environment.

The fluorescent pigment particles 108 fluoresce as pure white under a 405 nm laser, while appearing invisible when subject to visible spectrum ambient and non-directional light. In some examples, the fluorescent pigment particles 108 comprise yellow fluorescent pigment, such as Invisible Yellow Fluorescent Pigment available from Risk Reactor, Inc. The fluorescent pigment particles 108 are dispersed in the paint medium 104. While conventional knowledge would suggest that yellow fluorescent pigment particles would fluoresce yellow under the directional UV light, it was unexpectedly determined that yellow fluorescent pigment particles provided a purer white fluorescence (e.g., fluorescent light having a peak wavelength of between about 878 nm (blackbody temperature of about 3300K) and about 527 nm (blackbody temperature of about 5500K)) when illuminated with a 405 nm light source. This is believed to occur because common 405 nm light sources include off-center energy in the violet visible spectrum which combines with the yellow fluorescent emission to appear pure white. In contrast, conventional white fluorescent particles may appear bluish as a result of the same off-center emissions. In this manner, the off-center energy which may be more prevalent in less-expensive UV sources, is put to use in a way that increases brightness and whiteness coming from the portions of the surface illuminated with the UV source (rather than as a distracting bluish discoloration).

A composition described herein may be prepared by mixing together two or more components which may themselves be compositions. For example, a first component comprising the visible light absorptive particles 106 may be combined with a second component comprising the fluorescent pigment particles 108. In example embodiments, the paint composition may comprise between about 50% and 80% wt. of the visible light absorptive particles 106 and between about 15% and 30% wt. of the fluorescent pigment particles prior to the paint composition curing. In some examples, the screen gain may be increased by increasing the percentage by weight of the fluorescent pigment particles 108, light absorptive properties can be increased by increasing the percentage weight of the visible light absorptive particles 106. By mixing the visible light absorptive particles 106 and the fluorescent pigment particles 108 into a single mixture, the two-step application process of traditional paints is reduced to a single application step.

The paint composition 100 exhibits several unexpected properties and benefits. For example, the paint composition 100 appears as a matte black paint in the present of ambient, non-directional visible light, such as light from nearby lamps and lightbulbs. However, under directional light of a predetermined wavelength or range of wavelengths, such as light from a near UV light source, e.g. a 405 nm light source, the paint composition 102 at the points where the directional light strikes the paint composition 102 fluoresces as a pure white spot. Such a property was unexpected because conventional knowledge advised that white fluorescent pigment, not yellow, would fluoresce as pure white light. However, experimentation showed that yellow fluorescent pigment, rather than white fluorescent pigment, produced light that an observer perceives as pure white. Such unexpected properties allow for directional UV light to be projected with high contrast onto a black background that is imperceptible to observers. Thus bright objects, such as stars, may appear on an imperceptible surface that appears to observers to be simply a black night sky. Benefits of this unexpected property are discussed in further detail below with respect to FIG. 2.

A second unexpected property of the paint composition is the surprisingly high screen gain. Many traditional black paint compositions have screen gains of near-zero, meaning that any light projected onto the screen would not be reflected. However, the described composition unexpectedly demonstrates a screen gain of between about 0.10 and 0.30. In one example, the paint composition exhibits a screen gain of approximately 0.15. This level of reflectivity allows images to be perceptibly projected onto an otherwise imperceptible matte black surface. Benefits of this unexpected property are discussed in further detail below with respect to FIG. 3.

Figure 2:
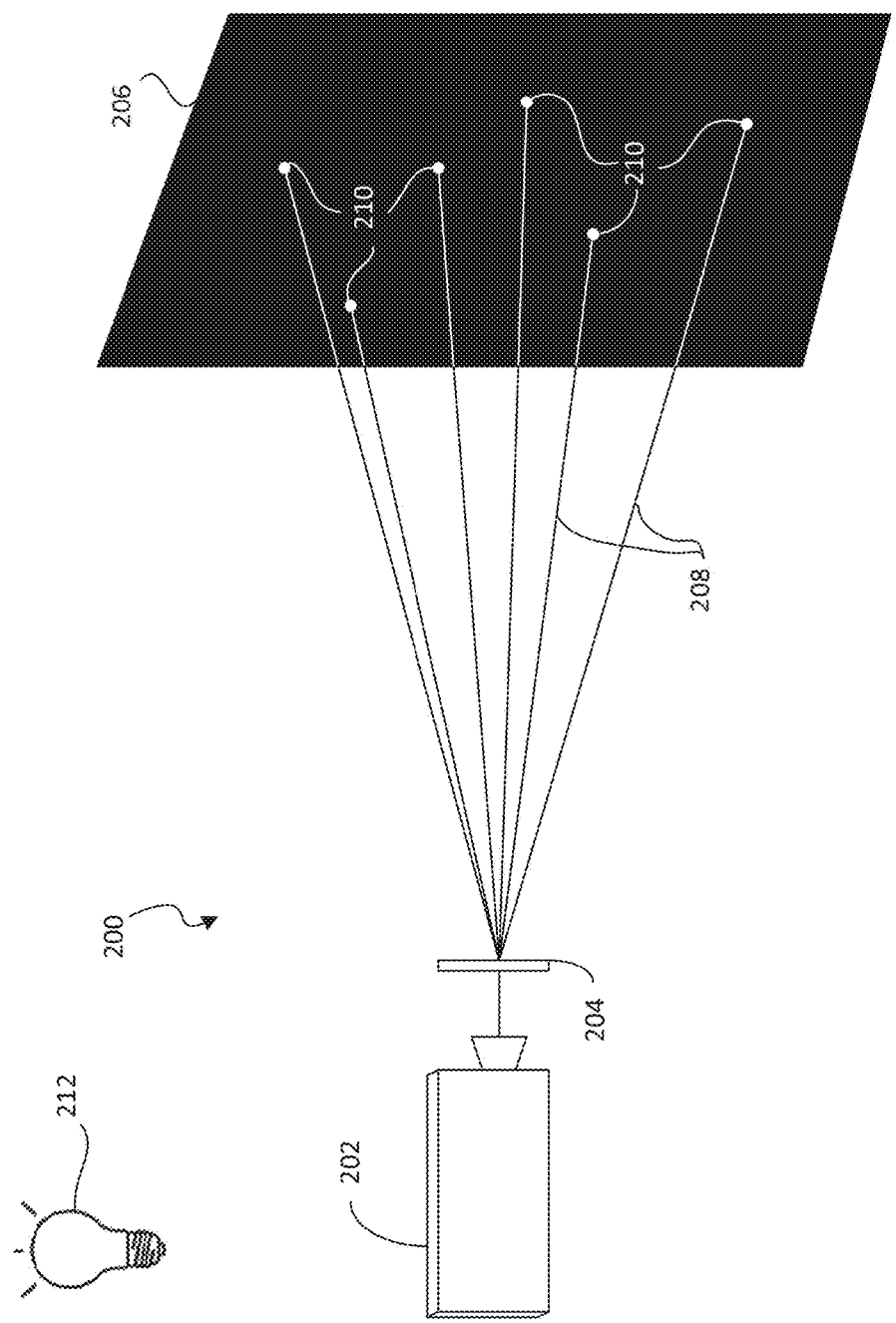
FIG. 2 is a perspective view of a projector system projecting laser light onto a substrate coated with the paint composition of FIG. 1.

FIG. 2 is a perspective view of a projection system, generally designated 200, projecting laser light onto a projection surface 206. The projection system 200 includes a light source 202, a spatial light modulator 204, a projection surface 206, and an ambient light source 212. The projection surface 206 is coated with the paint composition 100 of FIG. 1. For example, the projection surface 206 includes a substrate 102 with a coating of the paint composition 100 of FIG. 1.

The light source 202 projects light having a wavelength or wavelengths that, when interacting with the paint composition 100 coated on the projection surface 206, appears as pure white to an observer. For example, the light source 202 is a projector, such as a laser projector, an LCD projector, a DLP projector, or an LED projector. In another example, the light source 202 is a laser that emits a band of light having wavelengths centered around a peak wavelength, such as a 405 nm diode laser. In some examples, the light source 202 emits light in the near-UV or violet range (e.g., from about 300 nm to about 450 nm).

The spatial light modulator 204 directs light from the light source 202 toward surface 206 as suggested by light 208. The spatial light modulator 204 may be, for example, a diffraction grating, a mirror assembly, a prism, a beam splitter, an image forming device (e.g., a digital micromirror device), a combination thereof, or any other type of optical device. In one example, the spatial light modulator 204 is a ruled, holographic, and/or echelle reflection diffraction grating. In another example, the spatial light modulator 204 is a transmission or reflective diffraction grating.

The light 208 strike the projection surface 206 at points 210. In response to the light 208 striking the projection surface 206, the paint composition 100 (see FIG. 1) at the points 210 fluoresces as a pure white point on the matte black background of the projection surface 206. To an observer, the points 210 appear as white point sources of pure white light on the visibly imperceptible projection surface 206, just as stars appear as point sources of white light from the imperceptible blackness of the night sky.

The ambient light source 212 is a light source that emits non-directional light that impinges on the projection surface 206. For example, the ambient light source 212 can be a fluorescent/incandescent/halogen light bulb as are common in indoor environments. The ambient light source 212 may be an exit sign, or safety lighting as is common in many theater environments. Light from the ambient light source 212 interacts with and is absorbed by the visible light absorptive pigment particles 106 and does not interact with, or imperceptibly interacts with, the fluorescent pigment particles. Thus, even in the presence of light from the ambient light source 212, the projection surface 206 appears black to an observer.

Figure 3:
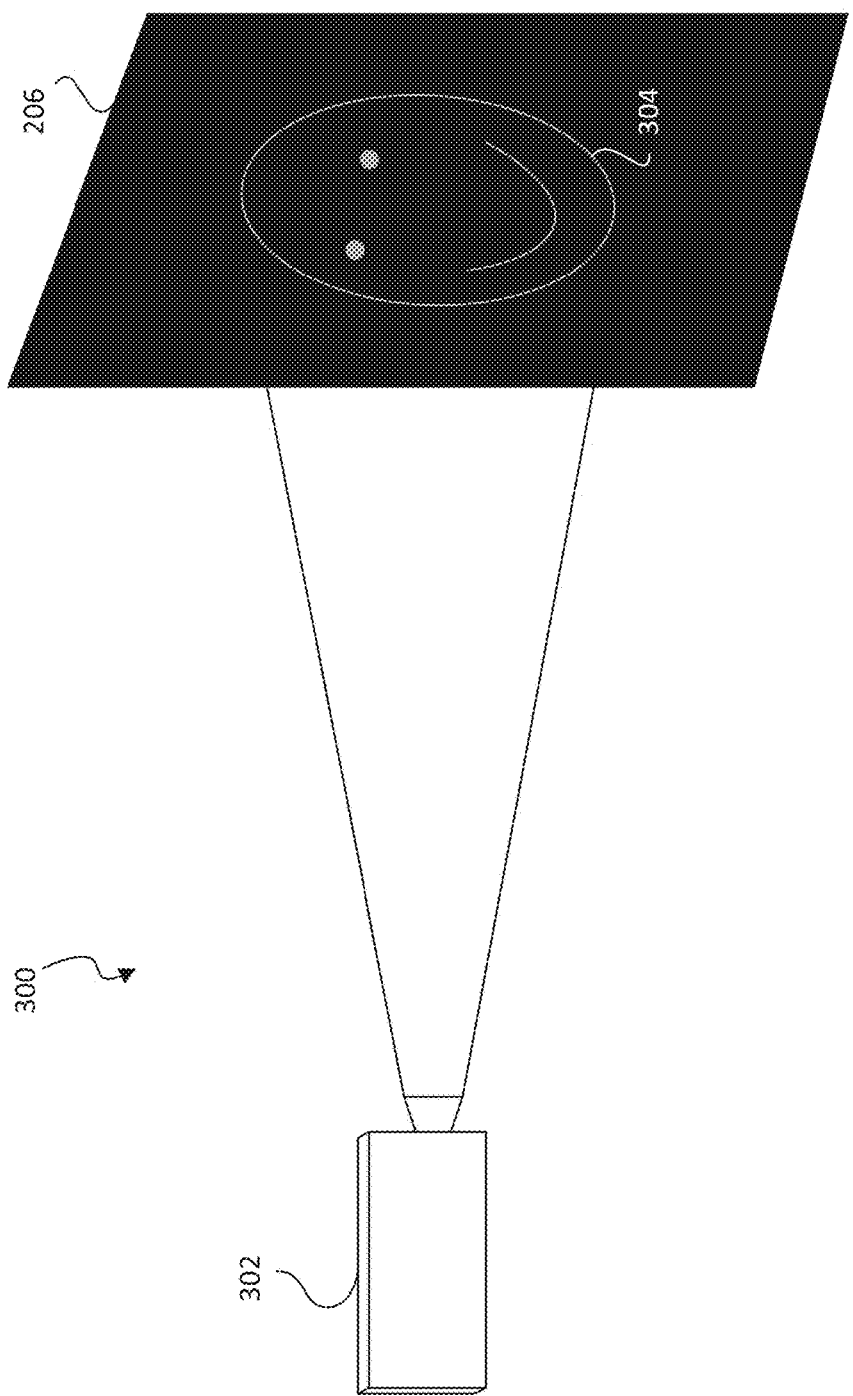
FIG. 3 is a perspective view of a projector system projecting an image onto a substrate coated with the paint composition of FIG. 1.

FIG. 3 is a perspective view of a projection system, generally designated 300, projecting an image onto the projection surface 206. The projection system 300 includes a projector 302. The projector 302 projects visible light to produce an image 304 on the projection surface 206. The projector 302 can generally use any suitable type of image projection technology. In some examples, the projector 302 can be used alone or in combination with light source 202 of FIG. 2.

The image 304 projected onto the projection surface 206 appears as a visible image to an observer because of the screen gain of the paint composition 100. Traditional black paints have a near-zero screen gain, meaning that the image 304 would not be visible to an observer. However, because the paint composition 100 unexpectedly exhibits a screen gain of about 0.15, the image 304 is visible to an observer. However, it should be noted that the image may appear as a low contrast image. For example, white light projected by the projector 302 may appear as grey or tan to an observer when reflected from the projection surface 206.

The discussion of any embodiment and/or example is meant only to be explanatory and is not intended to suggest that the scope of the disclosure, including the claims, is limited to these embodiments and/or examples. In other words, while illustrative embodiments and examples of the disclosure have been described in detail herein, it is to be understood that the inventive concepts may be otherwise variously embodied and employed, and that the appended claims are intended to be construed to include such variations, except as limited by the prior art.

What is claimed is:

1. A paint composition comprising:
   a carrier material;
   a plurality of ambient light absorbing pigment particles dispersed in the carrier material comprising a component that absorbs predetermined visible wavelengths; and
   a plurality of fluorescent pigment particles dispersed in the carrier material;
   wherein the fluorescent pigment particles emit a first color and the paint composition emits a second color different from the first color when illuminated by an ultraviolet light source.

2. The paint composition of claim 1 wherein the paint composition emits the second color when illuminated by a light source having a center emission wavelength of substantially 405 nm.

3. The paint composition of claim 1 wherein:
   the paint composition emits the second color when illuminated by a light source having a center emission wavelength of substantially 405 nm and emits off-center wavelengths in the violet visible spectrum; and
   the ambient light absorbing pigment particles reflect some of the off-center wavelengths.

4. The paint composition of claim 1, wherein the paint composition comprises between 50% wt and 80% wt of ambient light absorbing pigment particles prior to curing.

5. The paint composition of claim 1, wherein the paint composition comprises between 15% wt and 30% wt of fluorescent pigment particles.

6. The paint composition of claim 1, wherein the carrier material comprises a colorless acrylic paint medium.

7. The paint composition of claim 1, wherein the first color has peak wavelengths of between 878 nm and 527 nm.

8. The paint composition of claim 1, wherein the ambient light absorbing pigment particles comprise carbon visible light absorptive particles.

9. The paint composition of claim 1, wherein the fluorescent pigment particles comprise yellow emitting fluorescent pigment particles.

10. A paint comprising:
    a binder material;
    a plurality of ambient light absorbing pigment particles dispersed throughout the binder material; and
    a plurality of fluorescent pigment particles dispersed throughout the binder material, wherein the paint appears black under non-directional light and exhibits a screen gain of between 0.10 and 0.30 under directional light.

11. The paint of claim 10, wherein the paint exhibits a screen gain of 0.15.

12. The paint of claim 10, wherein the paint comprises between 50% wt. and 80% wt. of visible light absorptive particles prior to curing.

13. The paint of claim 10, wherein the paint comprises between 15% wt. and 30% wt. of fluorescent pigment particles prior to curing.

14. A projection system comprising:
a directional light source; and
a projection surface, the projection surface coated with a paint composition comprising:
  a binder material;
  a plurality of visible light absorptive particles dispersed throughout the binder material; and
  a plurality of fluorescent pigment particles dispersed throughout the binder material, wherein the paint composition absorbs ambient non-directional visible light and the paint composition emits white light under emissions from an ultraviolet light source.

15. The projection system of claim 14, wherein the directional light source comprises a laser light source.

16. The projection system of claim 15, wherein the laser light source emits light at a center frequency of 405 nm.

17. The projection system of claim 15, further comprising a spatial light modulator configured to disperse directional light from the directional light source onto the projection surface.

18. The projection system of claim 17, wherein the spatial light modulator comprises a diffraction grating.

19. The projection system of claim 14, wherein the paint composition comprises between 50% wt. and 80% wt. of visible light absorptive particles.

20. The projection system of claim 14, wherein the paint composition comprises between 15% wt. and 30% wt. of fluorescent pigment particles.

21. The projection system of claim 14, wherein:
the visible light absorptive particles comprise carbon visible light absorptive particles; and
the fluorescent pigment particles comprise yellow fluorescent pigment particles.

* * * * *